United States Patent
Poledna

(10) Patent No.: US 11,340,892 B2
(45) Date of Patent: May 24, 2022

(54) SAFETY MONITOR FOR ADVANCED DRIVER ASSISTANCE SYSTEMS

(71) Applicant: TTTech Auto AG, Vienna (AT)

(72) Inventor: Stefan Poledna, Klosterneuburg (AT)

(73) Assignee: TTTECH AUTO AG, Vienna (AT)

( * ) Notice: Subject to any disclaimer, the term of this patent is extended or adjusted under 35 U.S.C. 154(b) by 0 days.

(21) Appl. No.: 17/072,254

(22) Filed: Oct. 16, 2020

(65) Prior Publication Data
US 2021/0132940 A1 May 6, 2021

(30) Foreign Application Priority Data
Oct. 31, 2019 (EP) .................................. 19206483

(51) Int. Cl.
| | |
|---|---|
| *G06F 8/70* | (2018.01) |
| *G06F 8/10* | (2018.01) |
| *G06F 11/36* | (2006.01) |
| *G06F 21/57* | (2013.01) |
| *G06N 5/00* | (2006.01) |

(52) U.S. Cl.
CPC ................ *G06F 8/70* (2013.01); *G06F 8/10* (2013.01); *G06F 11/3684* (2013.01); *G06F 21/577* (2013.01); *G06N 5/003* (2013.01); *G06F 2221/033* (2013.01)

(58) Field of Classification Search
CPC .......... G06F 8/10; G06F 8/70; G06F 11/3684; G06F 2221/033; G06N 5/003
See application file for complete search history.

(56) References Cited

U.S. PATENT DOCUMENTS

| | | | | |
|---|---|---|---|---|
| 8,527,139 | B1 * | 9/2013 | Yousuf | G06F 11/2242 |
| | | | | 340/901 |
| 9,481,374 | B2 * | 11/2016 | Grewe | B60W 50/029 |
| 10,234,871 | B2 * | 3/2019 | Klaus | G05D 1/0285 |

(Continued)

FOREIGN PATENT DOCUMENTS

EP          3495218 A1    6/2019

OTHER PUBLICATIONS

Search Report for European Patent Application No. 19206483, dated Apr. 3, 2020 (7 pages).

*Primary Examiner* — Douglas M Slachta
(74) *Attorney, Agent, or Firm* — Eversheds Sutherland (US) LLP

(57) ABSTRACT

A method to maneuver a supervised vehicle based on an output of a software in development, wherein the software in development is part of an ASIL-classified function, and the software in development has not completed a software development process for ASIL classification of the ASIL-classified function. A safe device includes a safety monitor, wherein the safety monitor is implemented according to specific software development requirements, which are requirements for the ASIL classification of the ASIL-classified function. The safety monitor (i) monitors the output of the software in development, and (ii) classifies the output as either safe or unsafe, wherein the safe device executes a safety mechanism if the safety monitor classifies the output as unsafe, wherein the safety mechanism causes the supervised vehicle not to maneuver in accordance with the output, and if the safety monitor classifies the output as safe, the supervised vehicle is maneuvered based on the output.

11 Claims, 4 Drawing Sheets

(56) References Cited

U.S. PATENT DOCUMENTS

| | | | |
|---|---|---|---|
| 10,407,096 B2* | 9/2019 | Moretti | B62D 15/0265 |
| 10,782,700 B2* | 9/2020 | Kopetz | G05B 19/0428 |
| 10,795,804 B1* | 10/2020 | Nygaard | G06F 11/3696 |
| 10,919,524 B2* | 2/2021 | Poledna | B60W 30/09 |
| 2013/0173767 A1* | 7/2013 | Nakamura | H04L 43/0876 |
| | | | 709/222 |
| 2013/0246866 A1* | 9/2013 | Costin | G06F 11/3604 |
| | | | 714/48 |
| 2015/0033357 A1 | 1/2015 | Habel et al. | |
| 2015/0057908 A1 | 2/2015 | Carbonaro et al. | |
| 2016/0264115 A1 | 9/2016 | Schwindt et al. | |
| 2019/0113918 A1* | 4/2019 | Englard | G05D 1/024 |
| 2019/0162782 A1* | 5/2019 | Shanbhogue | G01R 31/31721 |
| 2019/0179738 A1* | 6/2019 | Hawthorne | G06F 30/20 |
| 2019/0303759 A1* | 10/2019 | Farabet | G06F 9/455 |
| 2020/0017114 A1* | 1/2020 | Santoni | B60W 50/023 |
| 2020/0148201 A1* | 5/2020 | King | B60W 30/0953 |
| 2020/0409773 A1* | 12/2020 | Kwong | G06F 9/545 |
| 2021/0081571 A1* | 3/2021 | Menzel | H04W 4/40 |
| 2021/0237763 A1* | 8/2021 | Berger | B60W 50/029 |

* cited by examiner

SAFETY MONITOR FOR ADVANCED DRIVER ASSISTANCE SYSTEMS

CROSS-REFERENCE TO RELATED APPLICATIONS

This application claims priority to European Patent Application No. 19206483.0, filed Oct. 31, 2019, which is incorporated herein by reference.

FIELD OF THE INVENTION

The invention relates to a method to maneuver a supervised vehicle based on or using an output of a software in development, wherein the software in development is part of an ASIL-classified function, wherein for example the ASIL-classified function is an ASIL A-classified function, or an ASIL B-classified function, or an ASIL C-classified function, or an ASIL D-classified function, and wherein the software in development has not completed a software development process required or highly required for said ASIL classification of said ASIL-classified function.

Furthermore, the invention relates to a Device, a so-called safe device, to monitor and control the output of software in development in a supervised vehicle, wherein the software in development is part of an ASIL-classified function, wherein for example the ASIL-classified function is an ASIL A-classified function, or an ASIL B-classified function, or an ASIL C-classified function, or an ASIL D-classified function, and wherein the software in development has not completed a software development process required or highly required for said ASIL classification of said ASIL-classified function, and wherein the supervised vehicle is configured to maneuver in accordance with the output of said software in development. Said output may be unsafe and may therefore result in an unsafe maneuver of the supervised vehicle if the vehicle is not controlled accordingly.

Finally, the invention relates to an Architecture to maneuver a supervised vehicle, wherein the architecture comprises one, two, or a multitude of sensors, one, two, or a multitude of actuators.

BACKGROUND OF THE INVENTION

Modern automobiles implement a significant amount of software often in the order of multiple millions of lines of code. Some of this software is part of a safety critical or safety relevant function in the automobile, for example, automated cruise control and actuator control in general. In order to ensure safety, such software is developed according to rigorous software design rules as for example defined in the ISO 26262 standard. In particular, said ISO 26262 standard defines Automotive Safety Integrity Levels (ASIL) from ASIL A (least critical ASIL) to ASIL D (most critical ASIL). During the design time of the automobile, safety relevant and safety critical functions are assigned an appropriate ASIL and based on this ASIL classification the appropriate software development mechanisms are recommended or highly recommended by the ISO 26262 standard. Naturally, the more critical the function is classified, the more rigor is (highly) recommended on the software development process. This rigor in the software development is costly in terms of efforts, but also in terms of development time.

SUMMARY OF THE INVENTION

It is an objective of the invention to disclose a method, device, and an overall automotive on-board software/hardware architecture to reduce the software development cost and the software development time.

This objective is achieved with a method as described above, wherein a safe device is provided, for example in that said safe device is implemented in the supervised vehicle, wherein a safety monitor is provided, wherein preferably the safe device comprises said safety monitor, wherein the safety monitor is implemented according to specific software development requirements, wherein said specific software development requirements are requirements required for the ASIL classification of the ASIL-classified function, and wherein the safety monitor monitors the output of the software in development, and the safety monitor classifies said output as either safe or unsafe, and wherein the safe device executes a safety mechanism in case that the safety monitor classifies said output as unsafe, wherein said safety mechanism causes the supervised vehicle not to maneuver in accordance with said output, and wherein in case that the safety monitor classifies said output as safe, the supervised vehicle is maneuvered based on or using said output.

Furthermore, this objective is achieved with a device as described above, wherein the safe device is adapted to execute said software in development, wherein said execution generates the output, or wherein an unsafe device executes said software in development, generating the output, and wherein the safe device is adapted to receive said output from the unsafe device by means of a communication infrastructure, and wherein the safe device comprises a safety monitor, and wherein the safety monitor is implemented according to specific software development requirements, wherein said specific software development requirements are requirements required for the ASIL classification of the ASIL-classified function, and wherein the safety monitor is adapted to monitor the output of the software in development, and wherein the safety monitor is adapted to classify said output as either safe or unsafe, and wherein the safe device is adapted to execute a safety mechanism in case that the safety monitor classifies said output as unsafe, wherein said safety mechanism causes the supervised vehicle not to maneuver in accordance with said output, and wherein in case that the safety monitor classifies said output as safe, the supervised vehicle is maneuvered based on or using said output.

Finally, this objective is achieved with an architecture as mentioned above, wherein the architecture comprises a safe device, and wherein the architecture comprises a software in development, wherein said software in development is executed either in said safe device, or wherein the architecture comprises in addition an unsafe device, and wherein the software in development is executed on said unsafe device, and wherein the software in development, based at least on sensor readings of said sensors, produces output, wherein the supervised vehicle may be maneuvered based on or using said output by providing said output to the actuators, wherein the software in development is part of an ASIL-classified function, wherein for example the ASIL-classified function is an ASIL A-classified function, or an ASIL B-classified function, or an ASIL C-classified function, or an ASIL D-classified function, and wherein the software in development has not completed a software development process required or highly required for said ASIL classification of said ASIL-classified function, and wherein the safe device is configured as a device as described above, and wherein the safe device is adapted to execute a safety mechanism in case that the safety monitor classifies said output as unsafe, wherein said safety mechanism causes the supervised vehicle not to maneuver in accordance with said output, and wherein in case that the safety monitor classifies said output as safe, the actuators maneuver the supervised vehicle based on or using said output.

The output of the software in development is monitored, and in case that said safety monitor classifies said output as unsafe a safety function comprised in said safe device is triggered, and said safety function causes that said output is not used by actuators and is neither used by actuator processing elements for the purpose of maneuvering of said supervised vehicle. Accordingly, the deployment of software for ASIL classified functions on an automobile is enabled while said software is still in development and the ASIL qualification process for said software is not completed. We call such software for ASIL classified functions that is in development and for which the ASIL qualification process has not been completed "software in development".

A software in development once deployed on the automobile has the ability to influence the physical movement of the automobile by producing output. As the software in development has not completed ASIL qualification, there is a risk that its output may influence the automobile movement in an unsafe manner. Such an unsafe influence could be for example, when the output causes the automobile to collide with an object on the street resulting in harm of the passengers of the automobile or other human beings in the surrounding of the automobile.

Thus, this invention discloses protecting mechanisms, collectively referred to as the "safety monitor" that monitor the output and interferes with the outputs in those cases when said safety monitor identifies the output to potentially result in unsafe behavior.

In this context, interferes means that the safety monitor prohibits the execution of unsafe outputs. This can be achieved, for example, by the safety monitor to block the output in case that it is unsafe and to cause the activation of (or switch to) a backup system which output is used instead of the (unsafe) output.

Preferably, the software in development is restricted to advanced driver assistance functions and automated driving functions below level 3 (according to SAE J3016). That means that in these deployment cases of the software in development SID the driver is responsible to always monitor the automobile behavior and to interfere in dangerous situations.

The method disclosed by this application is characterized in that the deployment of software in development is enabled by the implementation of a "safety monitor" that is already implemented completely according to the ASIL requirements to which the software in development should have been developed (but development has not been completed) and which controls the output of the software in development. The safety monitor may modify said output when it classifies the output of the software in development as "unsafe".

For sake of said classification, said safety monitor may implement a variable set of verification modules.

The device disclosed by this application is an entity that implements a safety monitor. Said device may be configured to implement both the safety monitor and software in development or the safety monitor only.

The automotive on-board software/hardware architecture disclosed by this application describes an implementation option of said method and device in an automobile.

It may be provided that the safety monitor comprises one, two, or a multitude of verification modules, wherein said one, two or more verification modules each execute a test or tests on the output of the software in development, and wherein in case that the test or tests executed by the verification modules indicate that the output is unsafe, the safety monitor raises a signal to the safety mechanism of the safe device. Said signal may activates the safety mechanism, which causes the supervised vehicle not to maneuver in accordance with said output.

In addition, it may be provided that each of the verification modules executes one, two, a multitude or all of the following tests: Collision Probability Test, Vehicle Stability Test, Legality and Regulations Test, Comfort and Convenience Test, Energy Efficiency Test, User-defined Preferences Test.

Furthermore, a decision maker may be provided, wherein preferably the safety monitor comprises said decision maker, and wherein preferably the decision maker integrates the test results from said verification modules.

In the architecture, one, two, or a multitude of sensor processing elements are provided, which are adapted to preprocess the sensor readings and to provide said preprocessed sensor readings to the software in development.

One, two, or a multitude of actuator processing elements may be provided, which are adapted to post-process the output of the software in development and to provide said post-processed output to the actuators.

The present invention relates to a method, device and architecture for testing a non-certified software (according to ASIL) ("software in development", SID) under real conditions. In addition to a safe driving path ("trajectories"), other aspects such as a comfortable behaviour (e.g., centrifugal forces), vehicle stability, energy efficiency, legal framework, etc. can be tested.

Even a non-optimal behavior of the SID may be tested and monitored.

Furthermore, the SID can be executed in an unsafe device, which may be realized in the form of a high performance device, and thus can be tested with a much higher performance.

The SID or the behaviour of the SID is not only recorded, but is put into effect (in that the SID maneuvers the vehicle), and at the same time the SID is monitored. In this way, decisions of the SID are during operation of the vehicle and thus any subsequent states of the SID and resulting critical errors can be tested.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION

Some of the many implementations of the invention are described next. If not stated otherwise, all details described in connection with a specific example are not only valid in connection with this example, but apply to the general scope of protection of the invention.

Figure 1:
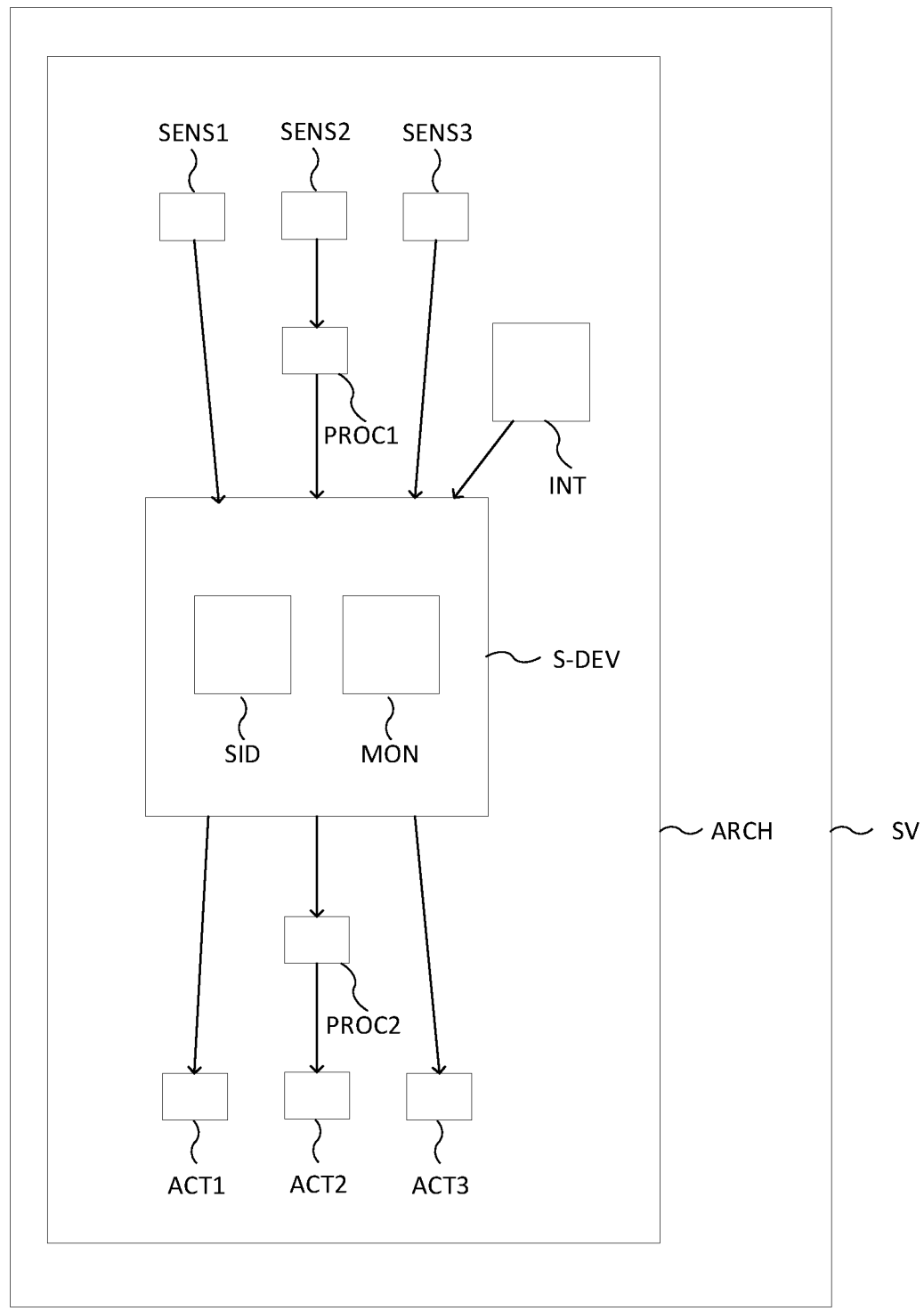
FIG. 1 an example of a network.

FIG. 1 depicts an example of a supervised vehicle SV, implementing an automotive on-board software/hardware architecture ARCH. Said architecture consists of or comprises one, two, or a multitude of sensors SENS1-SENS3, a safe device S-DEV, as well as one, two, or a multitude of actuators ACT1-ACT3. Furthermore, said architecture ARCH may further comprise sensor processing elements PROC1 and/or actuator processing elements PROC2. Furthermore, said architecture may comprise other processing elements INT. The safe device S-DEV may be configured to implement both a software in development SID and a safety monitor MON as depicted in FIG. 1.

In another embodiment, the safe device S-DEV may be configured to implement a safety monitor MON only. In this case, which is not depicted in FIG. 1, said architecture may implement an unsafe device US-DEV (see FIG. 3), wherein said unsafe device US-DEV is configured to implement said software in development SID.

The architecture ARCH may be configured to forward sensor readings from one, two, or a multitude of the sensors SENS1-SENS3 directly to the safe device S-DEV according to FIG. 1 and/or directly to an unsafe device US-DEV (in case that the architecture ARCH comprises said unsafe device US-DEV). Additionally or optionally, said architecture may be configured to forward sensor readings from one, two, or a multitude of sensors SENS1-SENS3 indirectly to said safe device S-DEV and/or to said unsafe device US-DEV (in case said architecture ARCH implements an unsafe device US-DEV). Said "indirect" forwarding means that a sensor, e.g., sensor SENS2 in FIG. 1, sends its sensor readings to a first processing element PROC1, which may preprocess said sensor readings, said first processing element PROC1 forwarding the sensor reading and/or the preprocessed sensor reading to the safe device S-DEV and/or may forward the sensor reading and/or the preprocessed sensor readings to an unsafe device US-DEV in case that the architecture ARCH implements an unsafe device US-DEV.

The architecture ARCH may be configured to forward the output of the safe device S-DEV directly to actuators ACT1-ACT3. The architecture ARCH may be configured to forward the output of the safe device S-DEV to a processing element PROC2 which post-processes said output of the safe device S-DEV. Said processing element PROC2 forwarding the post-processed output of the safe device S-DEV and/or the output of the safe device S-DEV to one, two, or a multitude of actuators, e.g., actuator ACT2 in FIG. 1.

Figure 2:
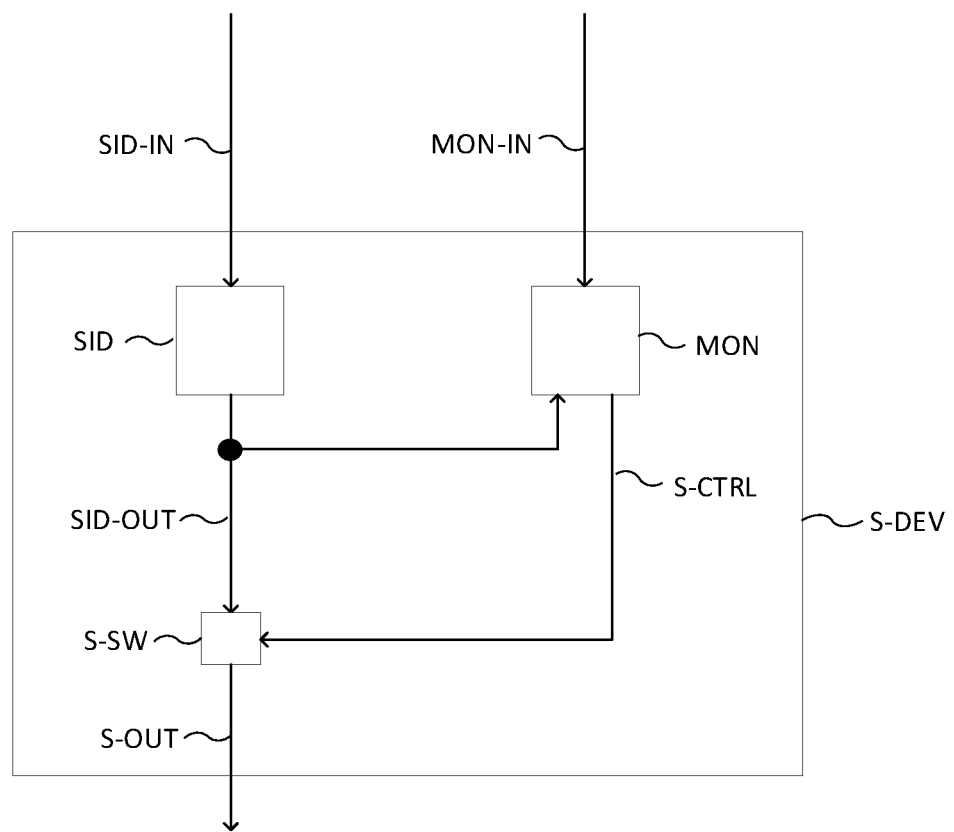
FIG. 2 an example of an inner structure of a safe device.

FIG. 2 depicts an example of an inner structure of a safe device S-DEV. As depicted the safe device in this embodiment is configured to implement a software in development SID and a safety monitor MON.

The inputs SID-IN to the software in development may be derived from one, more or all of the sensors SENS1-SENS3, in particular from sensor readings of said sensors, and/or from vehicle internal processing elements INT. The inputs MON-IN to the safety monitor may be derived from one, more or all of the sensors SENS1-SENS3, in particular from sensor readings of said sensors, and/or from vehicle internal processing elements INT. In case that both, the software in development and the monitor receive input (at least) from sensors, the sensors for the software in development and the monitor all may be identical, or the sensors all may be different, or some sensors may be identical and some may not be identical. The software in development SID is software for ASIL classified functions on the automobile, which software is in development and the ASIL qualification process for said software is not completed. Said software in development SID could be in an intermediate development state, for example:

said software in development SID is not approved for deployment on its own on the vehicle by the software manufacturer, said software in development SID is not approved for deployment on its own on the vehicle by the automotive system supplier that implements said software, or said software in development SID is not approved for deployment on its own by the automobile manufacturer.

Furthermore, said software in development SID may implement one, two, or a multitude of machine learning components and said machine learning component or components may be operated in a training phase.

Furthermore, said software in development SID may be continuously improved and thereby may remain in an uncompleted ASIL development process for multiple development iterations.

Furthermore, the software in development SID once deployed on the automobile has the ability to influence the physical movement of the automobile by producing output SID-OUT. As the software in development SID has not completed ASIL qualification, there is a risk that its output SID-OUT could influence the automobile movement in an unsafe manner.

To prevent unsafe maneuvers induced by the software in development SID, the safety monitor MON monitors said output SID-OUT of the software in development SID and functionality is provided, for example in that the safe device S-DEV is equipped with this functionality, such that, in case that the safe monitor MON classifies the output SID-OUT as unsafe, the unsafe output SID-OUT is changed to a safe output S-OUT, which will not cause the vehicle to maneuver unsafely.

Preferably, the safety monitor MON receives the same input as the software in development SID.

An example of said functionality, also called "safety mechanism" S-SW, in the S-DEV is a safe switch S-SW that is controlled by the safety monitor MON by means of a safe control signal S-CTRL: the safe switch is configured to forward the output of the software in development SID-OUT as output of the safe device S-OUT as long as the safety monitor does not classify said output SID-OUT as unsafe. However, when the safety monitor MON classifies the output of the software in development SID-OUT as unsafe it notifies the safe switch S-SW by means of the safety control signal S-CTRL. As a response to this notification, the safe switch S-SW stops forwarding the output SID-OUT of the software in development. Instead, the safe switch S-SW may produce other safe output S-OUT or no output at all as output of the safe device. The absence of an output S-OUT of the safe device S-DEV may cause the driver of the vehicle to take over control and/or may cause the activation of a backup. Said backup could be a function similar to the software in development SID and may be already completely developed according to an appropriate ASIL.

Figure 3:
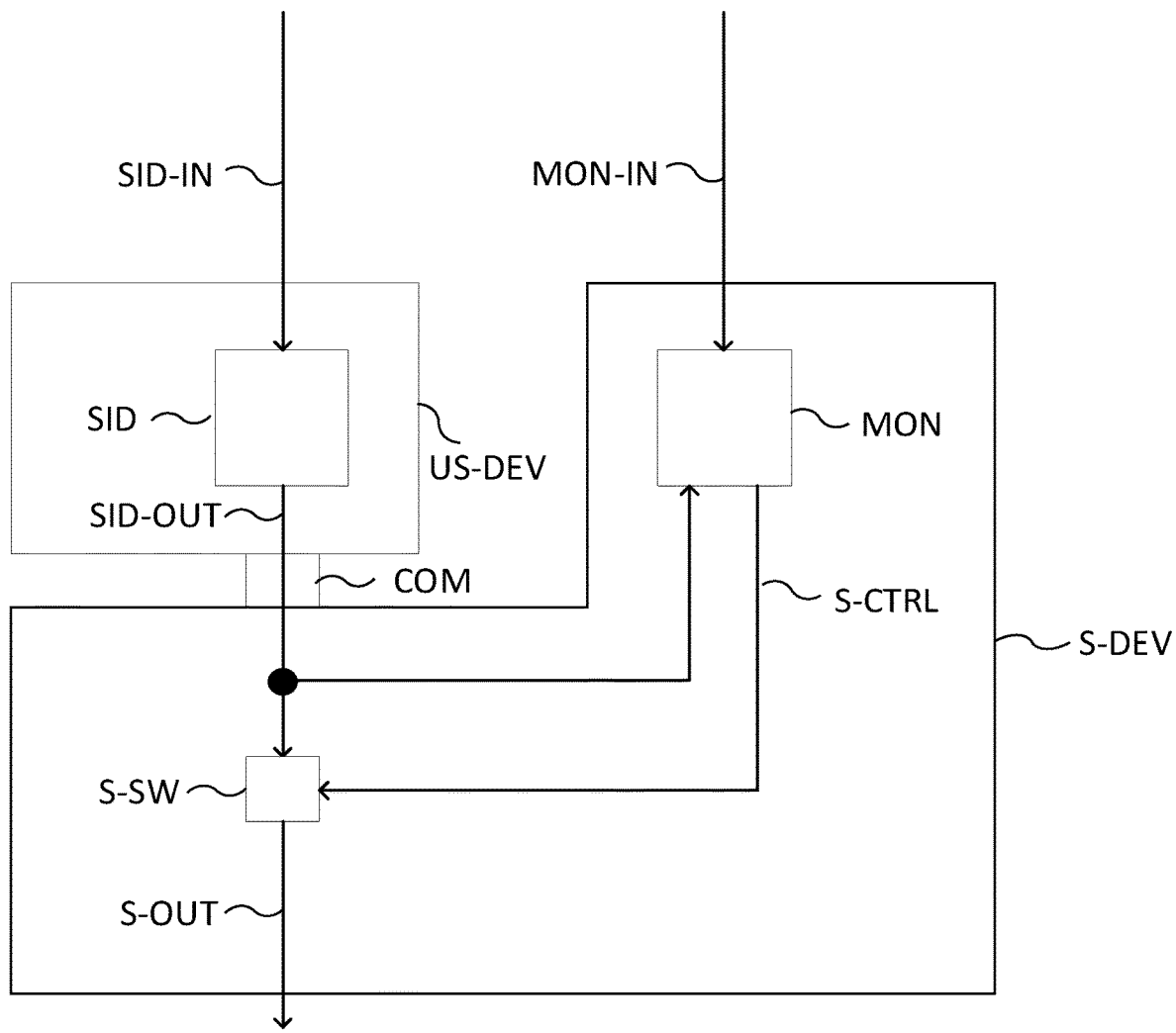
FIG. 3 another example of an inner structure of a safe device.

FIG. 3 depicts another example of an inner structure of a safe device S-DEV. As depicted the safe device comprises a safety monitor MON, as well as a safety mechanism, such as a safe switch S-SW. Furthermore, FIG. 3 depicts an unsafe device US-DEV which comprises a software in development SID. The unsafe device US-DEV communications the output SID-OUT of the software in development SID by means of a communication infrastructure COM to the safe device S-DEV. Said communication infrastructure COM may be realized as a simple point to point or bus connection as for example Ethernet or PCI/PCIe, but could also be realized in a more complex network, such as a larger switched Ethernet network.

Once the safe device S-DEV receives said output SID-OUT from the software in development realized in the unsafe device US-DEV it may behave analogously to the description under FIG. 2, i.e., the safe device S-DEV monitors and classifies the output SID-OUT and causes a change in the safe output S-OUT as necessary.

The unsafe device US-DEV may be a device that has higher performance than a safe device S-DEV, but may not be developed according to relevant safety standards such as ISO 26262. This would enable software in development SID to be used in a rather early stage of development, since typically software undergoes a transformation to meet rather restricted performance of safety (safe) devices.

Figure 4:
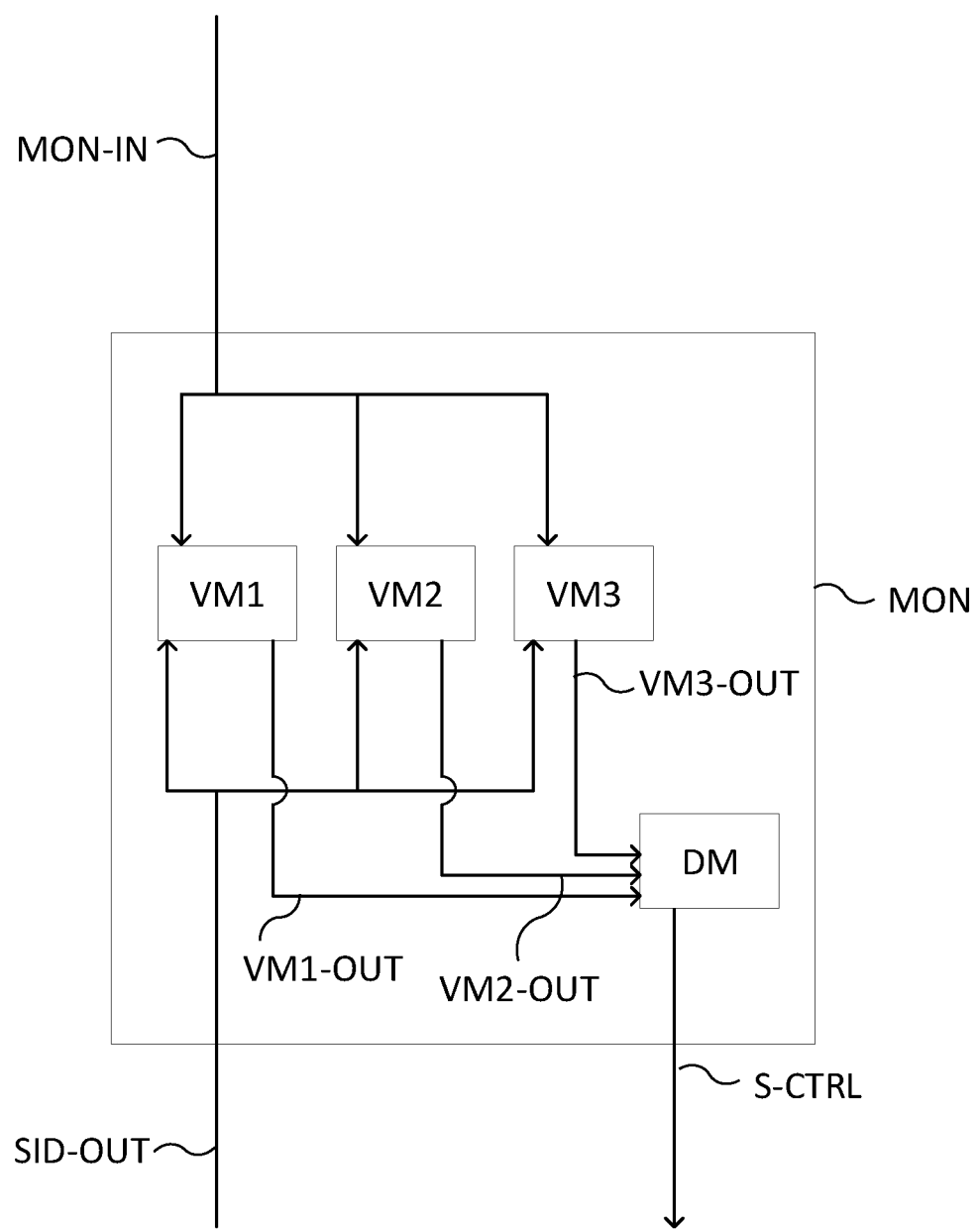
FIG. 4 an example realization of a safety monitor.

FIG. 4 depicts an example realization of a safety monitor MON. A safety monitor MON comprises one, two, or a multitude of verification modules, in the example shown three verification modules VM1-VM3, and a decision maker DM. The verification modules VM1-VM3 are configured to execute configurable tests on the provided output SID-OUT of the software in development SID. Preferably, different verification modules execute different tests.

Example tests of Verification Modules VM1-VM3 are as follows:
   Collision Probability Test CPT: the test assesses the likelihood that the vehicle SV would collide with an obstacle when maneuvering in accordance with the output SID-OUT.
   Vehicle Stability Test VST: the test assesses the likelihood that the vehicle SV becomes unstable from a control theory perspective when maneuvering in accordance with the output SID-OUT.
   Legality and Regulations Test LRT: the test assesses the likelihood that the vehicle SV adhers to configured legal rules (e.g., maximum speeds, minimum distance to other vehicles, behaving in accordance with street signs) when maneuvering in accordance with the output SID-OUT.
   Comfort and Convenience Test CCT: the test assesses whether the movement of the vehicle SV is sufficient comfortable when said vehicle SV was to maneuver in accordance with the output SID-OUT.
   Energy Efficiency Test EET: the test assesses whether the vehicle is sufficiently energy efficient when maneuvering in accordance with the output SID-OUT.
   User-defined Preferences Test UPT: the test assesses whether the vehicle GV adhers to user-defined restrictions (e.g., maximum speed limits preferences set by a user, maximum acceleration preference set by a user, other preferences) when maneuvering in accordance with the output SID-OUT.

The safety monitor MON implements a decision maker DM that collects results VM1-OUT-VM3-OUT of the tests executed by the verification modules VM1-VM3. The decision maker is configured to implement a decision logic that integrates said results and based on said integration of said results, that is for example an overall view of said results, classifies the output SID-OUT of the software in development SID as safe or unsafe. When the decision maker DM classifies said output SID-OUT as unsafe it is configured to exercise a signal S-CTRL that notifies the safety equipment, e.g., a safe switch S-SW, of the safe device S-DEV, of the classification that the output SID-OUT is unsafe.

In general, verification modules, such as the verification modules VM1-VM3 implement tests that each return a Quality Assessment, Q1-Q3, for the output SID-OUT of the software in development SID.

In general, it may be provided that the decision maker, such as the decision maker DM, normalizes said Quality Assessments Q1-Q3 to ranges, e.g. to a value RACT in a range between a minimum value RMIN and a maximum value RMAX.

It may further be provided that the decision maker DM is configured to implement configurable weights WACT, within an interval of a minimum weights WMIN and maximum weights WMAX, for the Quality Assessments Q1-Q3. It may be provided that the interval of configurable weights [WMIN, WMAX] is identical for two or more, in particular for all Quality Assessments Q1-Q3.

The decision maker DM may implement a ranking scheme that calculates a safety rank SR1 for the output SID-OUT of the software in development SID. The safety rank SR1 may be calculated as follows (where Qj represents the Quality Assessment of a verification module VMj that is classified as safety-relevant verification module S-VM):

$$SRi = \text{Sum}(WACT * Qji).$$

The Decision Maker DM may classify the output SID-OUT of the software in development SID as unsafe when the Safety Rank evaluates to a value that is higher than a configured threshold.

That which is claimed is:

1. A method to maneuver a supervised vehicle (SV) based on or using an output (SID-OUT) of a software in development (SID), wherein the software in development (SID) is part of an Automotive Safety Integrity Levels (ASIL)-classified function, wherein the ASIL-classified function is an ASIL A-classified function, an ASIL B-classified function, an ASIL C-classified function, or an ASIL D-classified function, and wherein the software in development (SID) has not completed a software development process required for said ASIL classification of said ASIL-classified function, the method comprising:
   providing a safe device (S-DEV), wherein said safe device (S-DEV) is implemented in the supervised vehicle (SV); and
   providing a safety monitor (MON), wherein the safe device (S-DEV) comprises said safety monitor (MON), wherein the safety monitor (MON) is implemented according to specific software development requirements, wherein said specific software development requirements are requirements required for the ASIL classification of the ASIL-classified function,
   wherein the safety monitor (MON) monitors the output (SID-OUT) of the software in development (SID), and the safety monitor (MON) classifies said output (SID-OUT) as either safe or unsafe,
   wherein the safe device (S-DEV) executes a safety mechanism (S-SW) in case that the safety monitor (MON) classifies said output (SID-OUT) as unsafe, wherein said safety mechanism (S-SW) causes the supervised vehicle (SV) not to maneuver in accordance with said output (SID-OUT), and
   wherein in case that the safety monitor (MON) classifies said output (SID-OUT) as safe, the supervised vehicle (SV) is maneuvered based on or using said output (SID-OUT).

2. The method according to claim 1, wherein the safety monitor (MON) comprises one or more verification modules (VM1-VM3), wherein said one or more verification modules (VM1-VM3) each execute a test or tests on the output (SID-OUT) of the software in development (SID), and wherein in case that the test or tests executed by the verification modules indicate that the output (SID-OUT) is unsafe, the safety monitor raises a signal (S-CTRL) to the safety mechanism (S-SW) of the safe device (S-DEV).

3. The method according to claim 2, wherein each of the verification modules (VM1-VM3) executes one or more of the following tests: Collision Probability Test, Vehicle Stability Test, Legality and Regulations Test, Comfort and Convenience Test, Energy Efficiency Test, and User-defined Preferences Test.

4. The method according to claim 1, further comprising providing a decision maker (DM), wherein the safety monitor (MON) comprises said decision maker (DM), and wherein the decision maker (DM) integrates the test results from said verification modules (VM1-VM3).

5. A safe device (S-DEV) configured to monitor and control the output (SID-OUT) of software in development (SID) in a supervised vehicle (SV), wherein the software in development (SID) is part of an Automotive Safety Integrity Level (ASIL)-classified function, wherein the ASIL-classified function is an ASIL A-classified function, or an ASIL B-classified function, an ASIL C-classified function, or an ASIL D-classified function, and wherein the software in development (SID) has not completed a software development process required for said ASIL classification of said ASIL-classified function, and wherein the supervised vehicle (SV) is configured to maneuver in accordance with the output (SID-OUT) of said software in development (SID), the safe device comprising:
 a safety monitor (MON),
  wherein the safe device (S-DEV) is adapted to execute said software in development (SID), wherein said execution generates the output (SID-OUT), or
  wherein an unsafe device (US-DEV) executes said software in development (SID), generating the output (SID-OUT), and wherein the safe device (S-DEV) is adapted to receive said output (SID-OUT) from the unsafe device (US-DEV) by a communication infrastructure (COM), and
  wherein the safety monitor (MON) is implemented according to specific software development requirements, wherein said specific software development requirements are requirements required for the ASIL classification of the ASIL-classified function,
  wherein the safety monitor (MON) is adapted to monitor the output (SID-OUT) of the software in development (SID), and wherein the safety monitor (MON) is adapted to classify said output (SID-OUT) as either safe or unsafe,
  wherein the safe device (S-DEV) is adapted to execute a safety mechanism (S-SW) in case that the safety monitor (MON) classifies said output (SID-OUT) as unsafe, wherein said safety mechanism (S-SW) causes the supervised vehicle (SV) not to maneuver in accordance with said output (SID-OUT), and
  wherein in case that the safety monitor (MON) classifies said output (SID-OUT) as safe, the supervised vehicle (SV) is maneuvered based on or using said output (SID-OUT).

6. The safe device according to claim 5, wherein the safety monitor (MON) comprises one or more verification modules (VM1-VM3), wherein said one or more verification modules (VM1-VM3) each are adapted to execute a test or tests on the output (SID-OUT) of the software in development (SID), and wherein in case that the test or tests executed by the verification modules indicate that the output (SID-OUT) is unsafe, the safety monitor is adapted to raise a signal (S-CTRL) to the safety mechanism (S-SW) of the safe device (S-DEV).

7. The safe device according to claim 6, wherein each of the verification modules (VM1-VM3) is adapted to execute one or more of the following tests: Collision Probability Test, Vehicle Stability Test, Legality and Regulations Test, Comfort and Convenience Test, Energy Efficiency Test, and User-defined Preferences Test.

8. The safe device according to claim 5, further comprising a decision maker (DM), wherein the safety monitor (MON) comprises said decision maker (DM), and wherein the decision maker (DM) integrates the test results from said verification modules (VM1-VM3).

9. An architecture (ARCH) to maneuver a supervised vehicle (SV), wherein the architecture (ARCH) comprises:
 one or more sensors (SENS1-SENS3);
 one or more actuators (ACT1-ACT3);
 a safe device (S-DEV); and
 a software in development (SID), wherein said software in development (SID) is configured to be executed in said safe device (S-DEV) or the architecture (ARCH) comprises in addition an unsafe device (US-DEV) and the software in development (SID) is executed on said unsafe device (US-DEV),
 wherein the software in development (SID), based at least on sensor readings of said sensors (SENS1-SENS3), is configured to produce output (SID-OUT), wherein the supervised vehicle (SV) is configured to be maneuvered based on or using said output (SID-OUT) by providing said output (SID-OUT) to the actuators (ACT1-ACT3),
 wherein the software in development (SID) is part of an Automotive Safety Integrity Levels (ASIL)-classified function, wherein the ASIL-classified function is an ASIL A-classified function, or an ASIL B-classified function, an ASIL C-classified function, or an ASIL D-classified function,
 wherein the software in development (SID) has not completed a software development process required or highly required for said ASIL classification of said ASIL-classified function,
 wherein the safe device (S-DEV) is configured as a device according to claim 5,
 wherein the safe device (S-DEV) is adapted to execute a safety mechanism (S-SW) in case that the safety monitor (MON) classifies said output (SID-OUT) as unsafe, wherein said safety mechanism (S-SW) causes the supervised vehicle (SV) not to maneuver in accordance with said output (SID-OUT), and
 wherein in case that the safety monitor (MON) classifies said output (SID-OUT) as safe, the actuators (ACT1-ACT3) maneuver the supervised vehicle (SV) based on or using said output (SID-OUT).

10. The architecture according to claim 9, further comprising one or more sensor processing elements (PROC1), which are adapted to preprocess the sensor readings and to provide said preprocessed sensor readings to the software in development (SID).

11. The architecture according to claim 9, further comprising one or more actuator processing elements (PROC2), which are adapted to post-process the output (SID-OUT) of the software in development (SID) and to provide said post-processed output to the actuators (ACT1-ACT3).

* * * * *